(12) United States Patent
Zhu et al.

(10) Patent No.: US 12,307,378 B1
(45) Date of Patent: May 20, 2025

(54) METHOD AND DEVICE FOR LABELING TRANSIENT VOLTAGE STABILITY SAMPLES IN POWER GRID BASED ON SEMI-SUPERVISED LEARNING

(71) Applicant: HUNAN UNIVERSITY, Changsha (CN)

(72) Inventors: Lipeng Zhu, Changsha (CN); Weijia Wen, Changsha (CN); Weizhi Huang, Changsha (CN); Zhikang Shuai, Changsha (CN); Jiayong Li, Changsha (CN); Cong Zhang, Changsha (CN); Bin Zhou, Changsha (CN); Jie Hou, Changsha (CN)

(73) Assignee: HUNAN UNIVERSITY, Changsha (CN)

( * ) Notice: Subject to any disclaimer, the term of this patent is extended or adjusted under 35 U.S.C. 154(b) by 0 days.

(21) Appl. No.: 18/829,358

(22) Filed: Sep. 10, 2024

(30) Foreign Application Priority Data

Apr. 2, 2024 (CN) .......................... 202410393884.5

(51) Int. Cl.
*G06N 3/08* (2023.01)
*G06N 3/0442* (2023.01)
(Continued)

(52) U.S. Cl.
CPC ......... *G06N 3/0895* (2023.01); *G06N 3/0442* (2023.01); *G06N 3/0455* (2023.01); *G06N 3/0464* (2023.01); *G06N 3/096* (2023.01)

(58) Field of Classification Search
CPC ....... G06F 18/241; G06F 18/214; G06F 18/23
See application file for complete search history.

(56) References Cited

FOREIGN PATENT DOCUMENTS

| CN | 112445831 A | 3/2021 |
|---|---|---|
| CN | 115409127 A | 11/2022 |

(Continued)

OTHER PUBLICATIONS

Shi Yang, et al., Transient Voltage Stability Assessment Method Based on Morphologically Similar Distance, Proceedings of the CSU-EPSA, 2020, pp. 105-112, vol. 32 No. 5.

(Continued)

*Primary Examiner* — Daniel C Puentes
(74) *Attorney, Agent, or Firm* — Ming Jiang; OPENPTO US LLC

(57) ABSTRACT

A method and device for labeling transient voltage stability samples in a power grid based on semi-supervised learning are provided. The method includes: S1: obtaining a transient voltage time series trajectory V formed for each load bus in the power grid under N transient operating scenarios; S2: preliminarily labeling the stability status of each transient operating scenario with a voltage time series dataset V, and integrating the labeling result $Y_i$ into a class label dataset Y; S3: constructing a voltage stability sample set $S=\{(V^i, Y_i)|1 \leq i \leq N\}$, dividing S into sample subsets $S_u$ and $S_k$; S4: labeling samples in $S_u$ by using a semi-supervised clustering learning method and a semi-supervised classification learning method to obtain result datasets $Y_{u1}$ and $Y_{u2}$ respectively; S5: performing interactive verification on $Y_{u1}$ and $Y_{u2}$, and updating $S_u$ and $S_k$; and S6: performing repeated iteration on the S4 and the S5.

16 Claims, 6 Drawing Sheets

(51) Int. Cl.
*G06N 3/0455* (2023.01)
*G06N 3/0464* (2023.01)
*G06N 3/0895* (2023.01)
*G06N 3/096* (2023.01)

(56) References Cited

FOREIGN PATENT DOCUMENTS

| | | | |
|---|---|---|---|
| CN | 115935264 A | | 4/2023 |
| CN | 116933860 A | | 10/2023 |
| CN | 117293799 A | | 12/2023 |
| CN | 117424201 A | | 1/2024 |
| CN | 117439063 A | * | 1/2024 |

OTHER PUBLICATIONS

Huang Dan, et al., Online monitoring of transient stability based on largest Lyapunov exponent dynamic characteristics of response trajectory, Electric Power Automation Equipment, 2020, pp. 48-55, vol. 40 No. 4.
Han Yanling, et al., Cooperative active learning and semi-supervised method for sea ice image classification, Haiyang Xuebao, 2020, pp. 123-135, vol. 42 No. 1.
Lipeng Zhu, et al., Semi-Supervised Ensemble Learning Framework for Accelerating Power System Transient Stability Knowledge Base Generation, IEEE Transactions on Power Systems, 2022, pp. 2441-2451, vol. 37 No. 3.

\* cited by examiner

METHOD AND DEVICE FOR LABELING TRANSIENT VOLTAGE STABILITY SAMPLES IN POWER GRID BASED ON SEMI-SUPERVISED LEARNING

CROSS REFERENCE TO THE RELATED APPLICATIONS

This application is based upon and claims priority to Chinese Patent Application No. 202410393884.5, filed on Apr. 2, 2024, the entire contents of which are incorporated herein by reference.

TECHNICAL FIELD

The present disclosure relates to the technical field of a power system, and specifically, to a method and device for labeling transient voltage stability samples in a power grid based on semi-supervised learning.

BACKGROUND

At present, an engineering criterion based on a fixed voltage threshold and time threshold is widely used in China and other countries as a standard for monitoring and determining transient voltage stability of a power grid. That is, when a bus voltage in the power grid is less than a given threshold and exceeds a preset time window, it is determined that the power grid will experience transient voltage instability, otherwise it is determined that the power grid will maintain transient voltage stability. The voltage threshold and the monitoring time window are often set based on subjective experience of power grid operators, and lack sufficient adaptability when applied to different scenarios in different power grids. This makes it difficult to guarantee accuracy and reliability of the transient voltage stability assessment result.

In the existing studies with machine learning taken as the core technique, data-driven technologies for assessing the transient voltage stability in the power grid have been extensively explored. This type of technology first collects each transient operating scenario of a to-be-monitored power grid through transient scenario generation tools like time-domain simulation to generate massive transient voltage stability samples, and then inputs the generated samples into a machine learning model for learning to derive a transient voltage stability assessment model for online monitoring. This type of technology usually uses the engineering criterion based on the fixed voltage threshold and time threshold to label whether the system can maintain stability or not in each transient operating scenario during the sample generation process, which will result in insufficient reliability of the labeled samples.

SUMMARY

In view of this, the present disclosure provides a method and device for labeling transient voltage stability samples in a power grid based on semi-supervised learning, to at least solve a problem that it is difficult to improve sample quality in an existing data-driven technology for assessing transient voltage stability of a power grid.

To achieve the above objective, the present disclosure adopts following technical solutions:

A method for labeling transient voltage stability samples in a power grid based on semi-supervised learning includes following steps:

S1: obtaining a transient voltage time series trajectory $V^i$ formed for each load bus in the power grid under N transient operating scenarios, where $1 \leq i \leq N$, and integrating all $V^i$ into a voltage time series dataset V, S2: preliminarily labeling the stability status of each transient operating scenario based on the voltage time series dataset V, and integrating the labeling result $Y_i$ into a class label dataset Y;

S3: using the V and the Y as input data and output data respectively to construct a voltage stability sample set $S = \{(V^i, Y_i) | 1 \leq i \leq N\}$, integrating a sample whose class information is unknown in the S into a sample subset $S_u$, with a sample quantity denoted as $N_u$, and integrating remaining data in the S into a sample subset $S_k$, with a sample quantity denoted as $N_k$, where $N_k + N_u = N$;

S4: labeling the stability statuses of the $N_u$ samples in the $S_u$ by using a semi-supervised clustering learning method and a semi-supervised classification learning method, to obtain labeling results $Y_{1j}$ and $Y_{2j}$ respectively, and integrating the labeling results $Y_{1j}$ and $Y_{2j}$ into result datasets $Y_{u1}$ and $Y_{u2}$ respectively, where $1 \leq j \leq N_u$;

S5: performing interactive verification on the $Y_{u1}$ and the $Y_{u2}$, moving all samples that pass the interactive verification from the $S_u$ to the $S_k$, and updating the $S_u$ and the $S_k$; and S6: performing repeated iteration on the S4 and the S5 until all samples in the $S_u$ pass the interactive verification or the repeated iteration is performed for M times, using $Y_{u1}$ obtained through the last-round iteration as the final labeling result of the $S_u$, merging finally updated sample subsets $S_u$ and $S_k$, and exporting a complete sample set $S' = S_u \cup S_k$ as the final sample set with definite transient voltage stability classes.

Preferably, the S1 includes following specific content:
collecting the N transient operating scenarios of the power grid that possibly occur in future T hours, performing N time-domain simulations on the collected N transient operating scenarios by using an electromechanical transient time-domain simulation method, and collecting the transient voltage time series trajectory of each load bus in the power grid after each time-domain simulation ends.

Preferably, the S2 includes following specific content:
S21: calculating the maximum Lyapunov exponent $\lambda_i$ for each transient operating scenario based on the V;
S22: preliminarily labeling the stability status of each transient operating scenario based on the $\lambda_i$; and
S23: integrating the labeling result $Y_i$ into the class label dataset Y.

Preferably, the S21 includes following specific content:
within a monitoring time window $\Delta T$, the maximum Lyapunov exponent of the $i^{th}$ transient operating scenario is:

$$\lambda_i = \frac{1}{nK\Delta t} \cdot \sum_{m=1}^{n} \ln \left\| \left( V^i_{(K+m)\Delta t} - V^i_{(K+m-1)\Delta t} \right) / \left( V^i_{m\Delta t} - V^i_{(m-1)\Delta t} \right) \right\|$$

where $\Delta t$ represents the time interval for sampling the transient voltage time series trajectory $V^i$, K represents the number of sampling points contained in the monitoring time window $\Delta T$, $\Delta T = K\Delta t$, n represents the number of initial trajectory sampling points, which is used to estimate the deviation of a time series trajectory in a process of calculating the maximum Lyapunov exponent, m represents the sequence number of an initial trajectory sampling point, 1≤m≤n, and $V_{k\Delta t}^i$ represents the voltage vector of each load bus at the $k^{th}$ sampling point in the transient voltage time series trajectory $V^i$, where k represents the sequence number of a sampling point, such as K+m, K+m−1, m, or m−1.

Preferably, the S22 includes following specific content:
setting a determination threshold η, where η>0;
if $\lambda_i>\eta$, determining that the transient operating scenario is in an obviously stable status, and labeling the class of the transient operating scenario as $Y_i=1$;
if $\lambda_i<-\eta$, determining that the transient operating scenario is in an obviously unstable status, and labeling the class of the transient operating scenario as $Y_i=-1$; and
if $-\eta \leq \lambda_i \leq \eta$, determining that the transient operating scenario is in an unknown status, and labeling the class of the transient operating scenario as $Y_i=0$.

Preferably, in the S3:
a sample with $Y_i=0$ in the S is a sample whose class information is unknown, and the sample with $Y_i=0$ is integrated into the sample subset $S_u$, with the sample quantity denoted as the $N_u$; and a sample with $Y_i \neq 0$ in the S is integrated into the sample subset $S_k$ with known classes, with the sample quantity denoted as the $N_k$.

Preferably, the procedure of obtaining a result dataset $Y_{u1}$ in the S4 includes following specific content:
performing unsupervised learning on input data of all samples in the S by using an autoencoder algorithm based on convolutional neurons, and extracting feature information of the hidden layer from an autoencoder;
performing clustering-enabled labeling on all the samples in the $S_u$ by using a semi-supervised clustering algorithm with the extracted feature information of the hidden layer as an input and class information of all samples in the $S_k$ as supervised information, which includes:
if a clustering-enabled labeling result is stable, labeling the class of the current sample as $Y_{1j}=1$;
if a clustering-enabled labeling result is unstable, labeling the class of the current sample as $Y_{ij}=-1$; and
after completing clustering-enabled labeling for the $N_u$ samples in the $S_u$, integrating all $Y_{1j}$ into the result dataset $Y_{u1}$.

Preferably, the procedure of obtaining a result dataset $Y_{u2}$ in the S4 includes following specific content:
performing unsupervised learning on input data of all samples in the S by using a long short-term memory (LSTM)-based autoencoder algorithm;
copying an encoder neural network, connecting the copied encoder neural network to a fully connected layer and a softmax activation layer to construct an LSTM classification model, and then inputting all samples in the $S_k$ into the constructed LSTM classification model for supervised finetuning and training to obtain a trained LSTM classification model;
inputting all the samples in the $S_u$ into the trained LSTM classification model for classification-enabled labeling, which includes:
if a classification-enabled labeling result is stable, labeling the class of the current sample as $Y_{2j}=1$;
if the classification-enabled labeling result is unstable, labeling the class of the current sample as $Y_{2j}=-1$; and
after completing the classification-enabled labeling for the $N_u$ samples in the $S_u$, integrating all $Y_{2j}$ into the result dataset $Y_{u2}$.

Preferably, the performing interactive verification on the $Y_{u1}$ and the $Y_{u2}$ in the S5 includes following specific content:
if $Y_{1j}=Y_{2j}$, determining that the $j^{th}$ sample in the $S_u$ has passed the interactive verification; and
if $Y_{1j} \neq Y_{2j}$, determining that the $j^{th}$ sample in the $S_u$ has not passed the interactive verification.

A device for labeling transient voltage stability samples in a power grid based on semi-supervised learning includes a memory, a processor, and a computer program stored in the memory and running on the processor. The processor executes the computer program to implement the method for labeling transient voltage stability samples in a power grid based on semi-supervised learning.

Based on the above technical solutions, it can be seen that, compared with the prior art, the present disclosure provides a method and device for labeling transient voltage stability samples in a power grid based on semi-supervised learning, and achieves following beneficial effects: The present disclosure solves a problem that it is difficult to improve sample quality in an existing data-driven technology for assessing transient voltage stability of a power grid, effectively guarantees generation quality of massive transient voltage stability samples, and provides important support for implementing and applying the existing data-driven technology to assess transient voltage stability in a practical power grid.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may still derive other accompanying drawings from these accompanying drawings without creative efforts.

DETAILED DESCRIPTION OF THE EMBODIMENTS

The technical solutions in the embodiments of the present disclosure are described clearly and completely below with reference to the accompanying drawings in the embodiments of the present disclosure. Apparently, the described embodiments are merely some rather than all of the embodiments of the present disclosure. All other embodiments obtained by those skilled in the art based on the embodiments of the present disclosure without creative efforts shall fall within the protection scope of the present disclosure.

Figure 1:
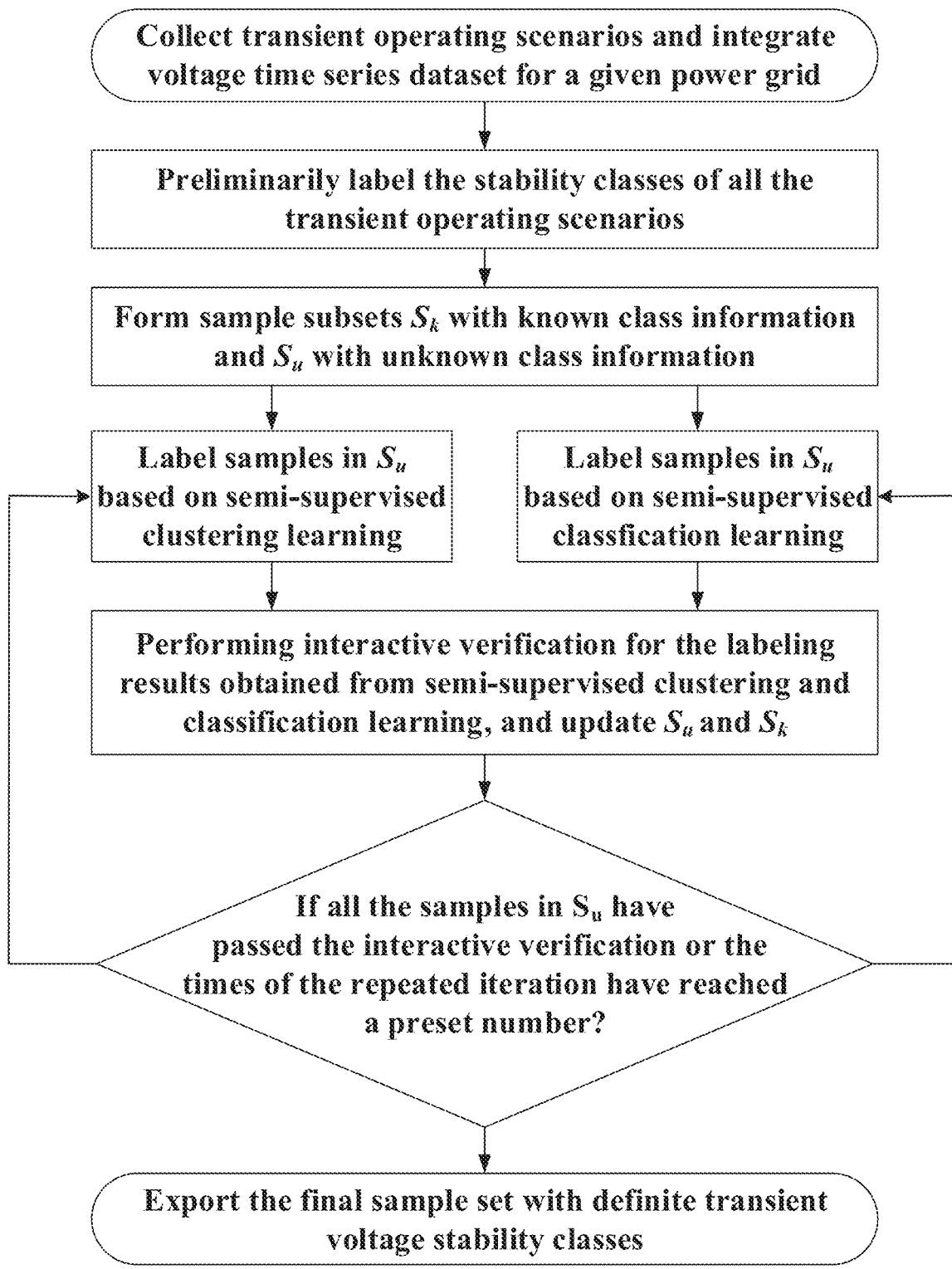
FIG. 1 is a flowchart of a method for labeling transient voltage stability samples in a power grid based on semi-supervised learning according to an embodiment of the present disclosure.

The present disclosure provides a method for labeling transient voltage stability samples in a power grid based on semi-supervised learning. As shown in FIG. 1, the following steps are included:

S1: A transient voltage time series trajectory $V^i$ formed for each load bus in the power grid is obtained under N transient operating scenarios, where $1 \leq i \leq N$, and all $V^i$ are integrated into a voltage time series dataset V.

S2: A stability status of each transient operating scenario is preliminarily labeled based on the voltage time series dataset V, and the labeling result $Y_i$ is integrated into a class label dataset Y.

S3: The V and the Y are used as input data and output data respectively to construct a voltage stability sample set $S=\{(V^i, Y_i)|1 \leq i \leq N\}$, a sample whose class information is unknown in the S is integrated into a sample subset $S_u$, with a sample quantity denoted as $N_u$, and remaining data in the S is integrated into a sample subset $S_k$, with a sample quantity denoted as $N_k$, where $N_k+N_u=N$.

S4: Stability statuses of the $N_u$ samples in the $S_u$ are labeled by using a semi-supervised clustering learning method and a semi-supervised classification learning method, to obtain labeling results $Y_{1j}$ and $Y_{2j}$ respectively, and the labeling results $Y_{1j}$ and $Y_{2j}$ are integrated into result datasets $Y_{u1}$ and $Y_{u2}$ respectively, where $1 \leq j \leq N_u$.

S5: Interactive verification is performed on the $Y_{u1}$ and the $Y_{u2}$, all samples that pass the interactive verification are moved from the $S_u$ to the $S_k$, and the $S_u$ and the $S_k$ are updated.

S6: Repeated iteration is performed on the S4 and the S5 until all samples in the $S_u$ pass the interactive verification or the repeated iteration is performed for M times, $Y_{u1}$ obtained through the last-round iteration is used as the final labeling result of the $S_u$, finally updated sample subsets $S_u$ and $S_k$ are merged, and a complete sample set $S'=S_u \cup S_k$ is exported as the final sample set with definite transient voltage stability classes.

It should be noted that:

In this embodiment, the method for labeling transient voltage stability samples in a power grid based on semi-supervised learning is further explained in detail with reference to the above steps. Firstly, the time-domain simulation is performed for various transient operating scenarios that may occur in the power grid in a future period of time. The transient voltage time series trajectory of each load bus is collected from a time-domain simulation result process to obtain the voltage time series dataset.

In this embodiment, the maximum Lyapunov exponent for each transient operating scenario is calculated by using the voltage time series dataset, and each transient operating scenario is preliminarily labeled based on a result of calculating the maximum Lyapunov exponent. Transient operating scenarios with classes obtained through the preliminary labeling being obviously stable and obviously unstable are integrated into a sample subset with known classes, and remaining transient operating scenarios are integrated into a sample subset with unknown classes. All samples in the sample subset with unknown classes are re-labeled separately through semi-supervised clustering learning and semi-supervised classification learning. The interactive verification is performed on labeling results obtained through the two types of semi-supervised learning. If labeling results obtained for a sample through the two types of semi-supervised learning are consistent, it indicates that the two types of semi-supervised learning can reliably label the sample. Then, the sample is added to the sample subset with known classes. The iteration and the interactive verification are repeated until all samples pass class consistency verification or a preset quantity of iterations is reached. Therefore, all the samples are reliably labeled, and transient voltage stability samples set with complete input and output data is ultimately exported.

This embodiment combines a maximum Lyapunov exponent method based on a nonlinear system theory with an advanced machine learning method, and implements highly-reliable sample labeling for various complex transient operating scenarios in an actual power grid through hierarchical sample class labeling and interactive sample class verification.

In this embodiment, when being applied to the power grid, unlike an engineering criterion based on a fixed voltage threshold and time threshold used in the actual power grid, the present disclosure does not rely on an empirical voltage threshold or time threshold setting, but independently mines and explores the convergence/divergence characteristic of a time series trajectory of the power grid under different transient operating scenarios, and the key feature related to the stability/instability class hidden behind the convergence/divergence characteristic.

In this embodiment, the sample labeling method based on interactive semi-supervised learning can also effectively guarantee generation quality of massive transient voltage stability samples, and provides important support for implementing and applying an existing data-driven technology for assessing the transient voltage stability of the power grid in the actual power grid.

In order to further implement the above technical solutions, the S1 includes following specific content:

The N transient operating scenarios of the power grid that possibly occur in future Thours are collected, N time-domain simulations are performed on the collected N transient operating scenarios by using an electromechanical transient time-domain simulation method, and the transient voltage time series trajectory of each load bus in the power grid is collected after each time-domain simulation ends.

Figure 2:
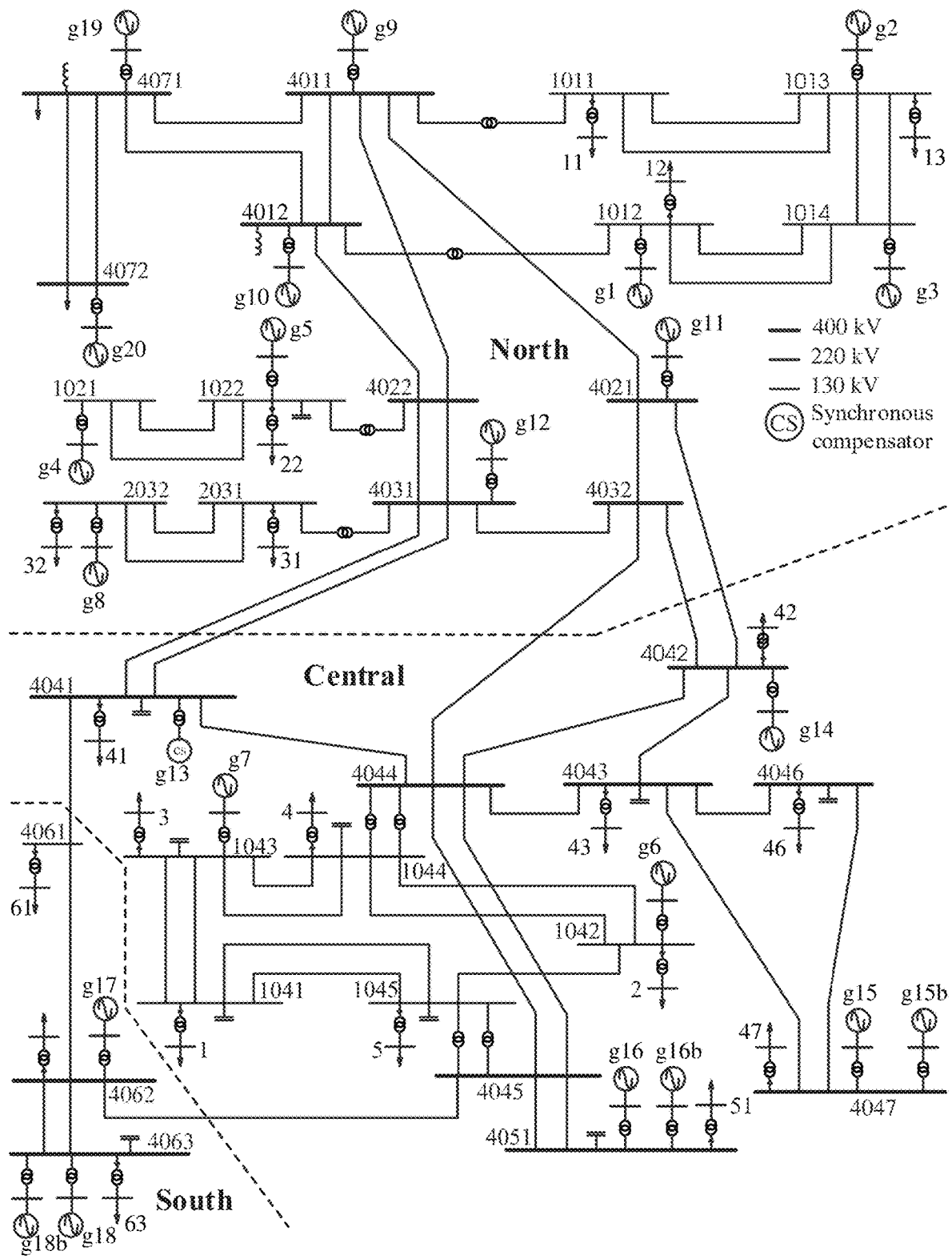
FIG. 2 is a single-line structural diagram of a power grid for time-domain simulation according to an embodiment of the present disclosure.

It should be noted that:

In this embodiment, the N time-domain simulations are performed on the collected N transient operating scenarios by using the electromechanical transient time-domain simulation method. FIG. 2 is a single-line structural diagram of the power grid in the time-domain simulation.

Figure 3:
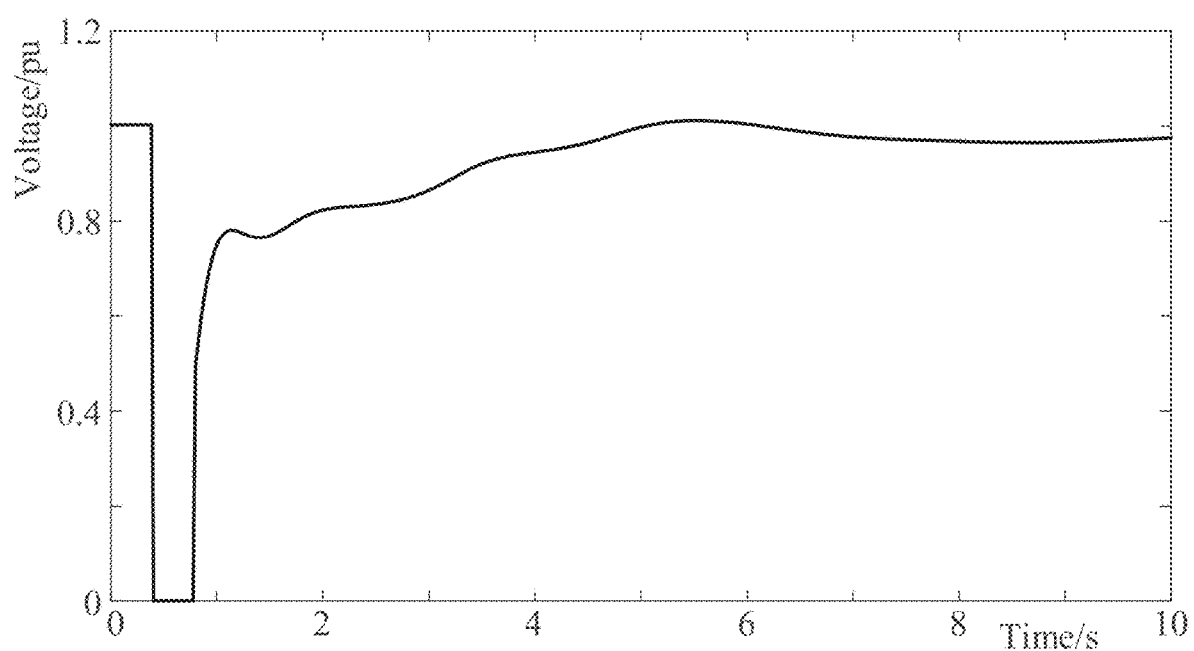
FIG. 3 is a schematic diagram of a transient voltage time series trajectory of a load bus in a time-domain simulation according to an embodiment of the present disclosure.

FIG. 3 is a schematic diagram of a transient voltage time series trajectory of a load bus in a time-domain simulation.

In order to further implement the above technical solutions, the S2 includes following specific content:

S21: The maximum Lyapunov exponent $\lambda_i$ is calculated for each transient operating scenario based on the V.

S22: The stability status of each transient operating scenario is preliminarily labeled based on the $\lambda_i$.

S23: The labeling result $Y_i$ is integrated into the class label dataset Y.

In order to further implement the above technical solutions, the S21 includes following specific content:

Within a monitoring time window $\Delta T$, the maximum Lyapunov exponent of an $i^{th}$ transient operating scenario is:

$$\lambda_i = \frac{1}{nK\Delta t} \cdot \sum_{m=1}^{n} \ln \left\| \left( V^i_{(K+m)\Delta t} - V^i_{(K+m-1)\Delta t} \right) / \left( V^i_{m\Delta t} - V^i_{(m-1)\Delta t} \right) \right\|$$

In the above formula, $\Delta t$ represents the time interval for sampling the transient voltage time series trajectory $V^i$, K represents the number of sampling points contained in the monitoring time window $\Delta T$, $\Delta T = K\Delta t$, n represents the number of initial trajectory sampling points, which is used to estimate the deviation of a time series trajectory in a process of calculating the maximum Lyapunov exponent, m represents the sequence number of an initial trajectory sampling point, $1 \leq m \leq n$, and $V_{k\Delta t}{}^i$ represents the voltage vector of each load bus at the $k^{th}$ sampling point in the transient voltage time series trajectory $V^i$, where k represents the sequence number of a sampling point, such as K+m, K+m−1, m, or m−1.

In order to further implement the above technical solutions, the S22 includes following specific content:

A determination threshold $\eta$ is set, where $\eta > 0$.

If $\lambda_i > \eta$, it is determined that the transient operating scenario is in an obviously stable status, and the class of the transient operating scenario is labeled as $Y_i = 1$.

If $\lambda_i < -\eta$, it is determined that the transient operating scenario is in an obviously unstable status, and the class of the transient operating scenario is labeled as $Y_i = -1$.

If $-\eta \leq \lambda_i \leq \eta$, it is determined that the transient operating scenario is in an unknown status, and the class of the transient operating scenario is labeled as $Y_i = 0$.

In order to further implement the above technical solutions, in the S3:

A sample with $Y_i = 0$ in the S is a sample whose class information is unknown, and the sample with $Y_i = 0$ is integrated into the sample subset $S_u$, with the sample quantity denoted as the $N_u$. A sample with $Y_1 \neq 0$ in the S is integrated into the sample subset $S_k$ with known classes, with the sample quantity denoted as the $N_k$.

In order to further implement the above technical solutions, the procedure of obtaining a result dataset $Y_{u1}$ in the S4 includes following specific content:

Unsupervised learning is performed on input data of all samples in the S by using an autoencoder algorithm based on convolutional neurons, and feature information of a hidden layer is extracted from an autoencoder.

Clustering-enabled labeling is performed on all the samples in the $S_u$ by using a semi-supervised clustering algorithm with the extracted feature information of the hidden layer as an input and class information of all samples in the $S_k$ as supervised information.

If a clustering-enabled labeling result is stable, the class of a current sample is labeled as $Y_{ij} = 1$.

If a clustering-enabled labeling result is unstable, the class of a current sample is labeled as $Y_{ij} = -1$.

After the clustering-enabled labeling is completed for the $N_u$ samples in the $S_u$, all $Y_{1j}$ are integrated into the result dataset $Y_{u1}$.

Figure 4:
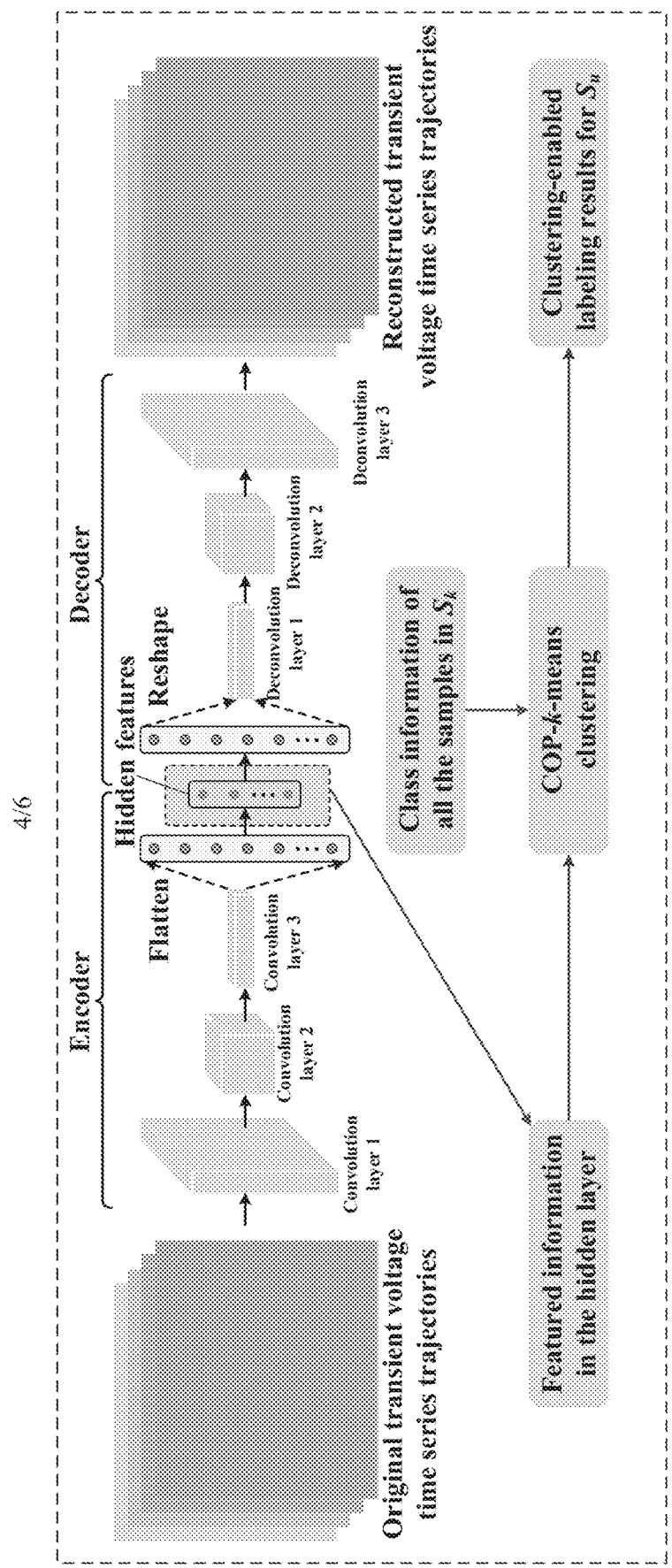
FIG. 4 is a schematic diagram of semi-supervised clustering-enabled labeling based on a convolutional autoencoder according to an embodiment of the present disclosure.

It should be noted that:

In this embodiment, as shown in FIG. 4, a convolutional autoencoder is used to perform the unsupervised learning on the input data (transient voltage time series trajectories) of all the samples in the voltage stability sample set S. Firstly, an encoder constituted by a plurality of stacked convolutional layers is used to encode and learn original transient voltage time series trajectories of all the samples. Then, a decoder constituted by a plurality of stacked inverse convolutional layers is used to decode and reconstruct an encoding and learning result. A layer at which the encoder and the decoder are connected is the hidden layer, and feature information obtained through the encoding and learning is extracted from the hidden layer. The extracted feature information of the hidden layer is used as the input, and the class information of all the samples in the sample subset $S_k$ is used as the supervised information. The clustering-enabled labeling is performed on all the samples in the $S_u$ by using a COP-k-means semi-supervised clustering algorithm to obtain clustering-enabled labeling results of all the samples in $S_u$. A value of k is 2.

In order to further implement the above technical solutions, the procedure of obtaining a result dataset $Y_{u2}$ in the S4 includes following specific content:

The unsupervised learning is performed on the input data of all the samples in the S by using an LSTM-based autoencoder algorithm.

An encoder neural network is copied, the copied encoder neural network is connected to a fully connected layer and a softmax activation layer to construct an LSTM classification model, and then all the samples in the $S_k$ are input into the constructed LSTM classification model for supervised finetuning and training to obtain a trained LSTM classification model.

All the samples in the $S_u$ are input into the trained LSTM classification model for classification-enabled labeling.

If a classification-enabled labeling result is stable, the class of a current sample is labeled as $Y_{2j} = 1$.

If the classification-enabled labeling result is unstable, the class of the current sample is labeled as $Y_{2j} = -1$.

After the classification-enabled labeling is completed for the $N_u$ samples in the $S_u$, all $Y_{2j}$ are integrated into the result dataset $Y_{u2}$.

Figure 5:
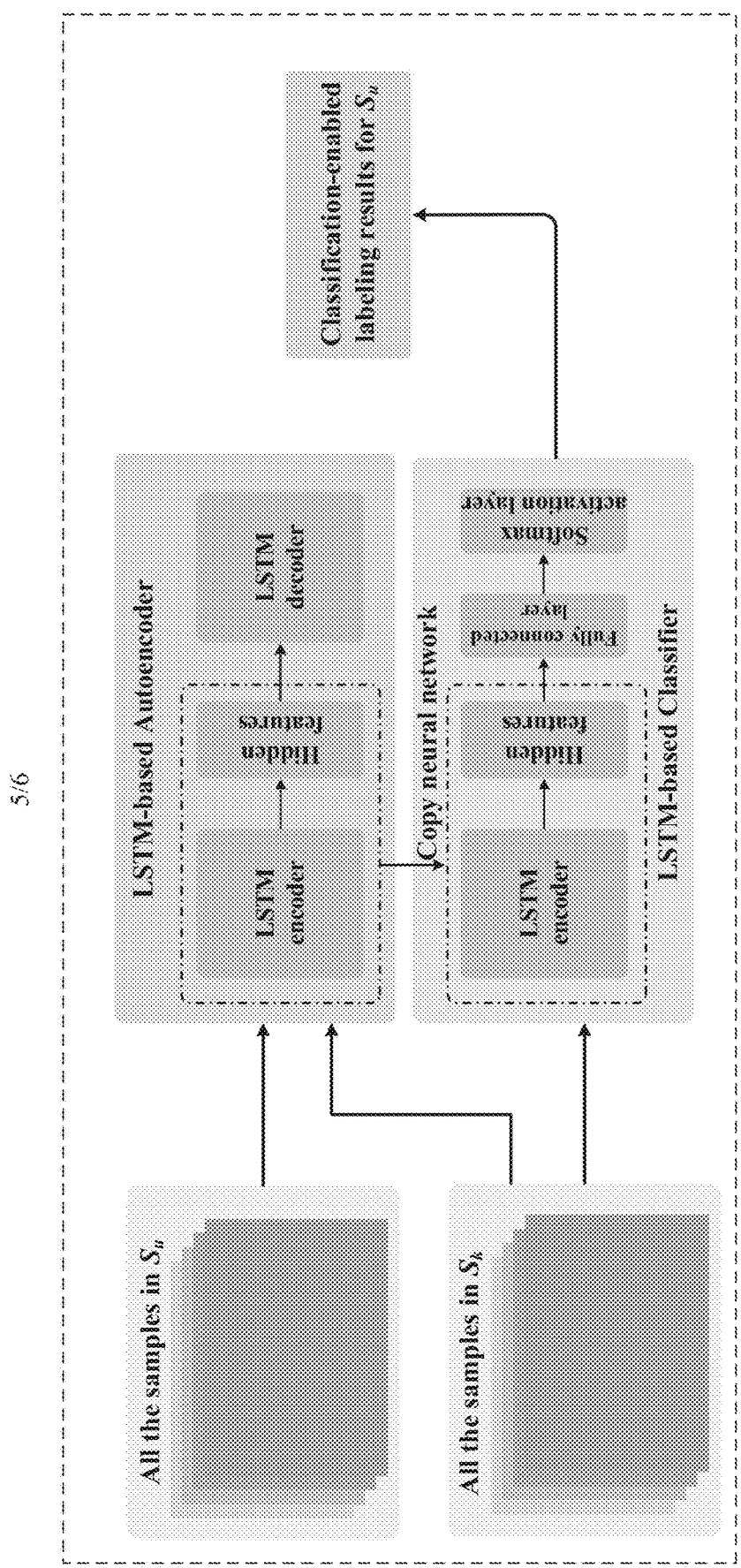
FIG. 5 is a schematic diagram of semi-supervised classification-enabled labeling based on an LSTM autoencoder according to an embodiment of the present disclosure.

In this embodiment, as shown in FIG. 5, an LSTM autoencoder is used to perform unsupervised pre-learning on the input data of all the samples in the sample subset $S_k$ and the sample subset $S_u$. A neural network containing an LSTM encoder and a feature of the hidden layer is copied, and the copied encoder neural network and the copied feature of the hidden layer are connected to the fully connected layer and the Softmax activation layer to obtain an LSTM classifier for class labeling. All the samples in the sample subset $S_k$ are input into the LSTM classifier for classification learning. After the classification learning is completed, the LSTM classifier is used to perform the classification-enabled labeling on all the samples in the sample subset $S_u$ to obtain classification-enabled labeling results of all the samples in the $S_u$.

In order to further implement the above technical solutions, the performing interactive verification on the $Y_{u1}$ and the $Y_{u2}$ in the S5 includes following specific content:

If $Y_{1j} = Y_{2j}$, it is determined that a $j^{th}$ sample in the $S_u$ has passed the interactive verification.

If $Y_{1j} \neq Y_{2j}$, it is determined that the $j^{th}$ sample in the $S_u$ has not passed the interactive verification.

Figure 6:
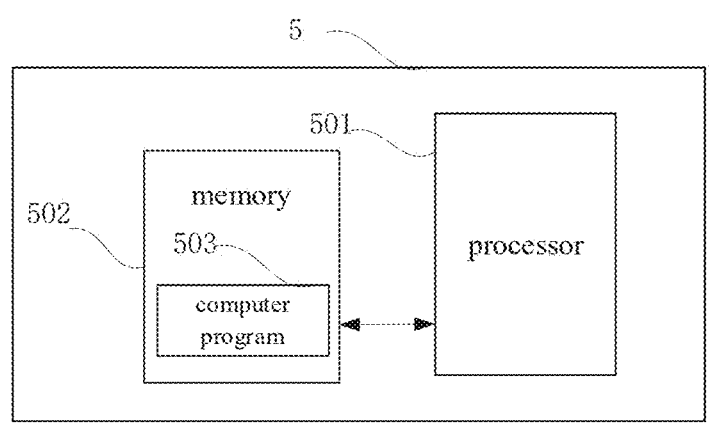
FIG. 6 is a structural diagram of a device of a method for labeling transient voltage stability samples in a power grid based on semi-supervised learning according to an embodiment of the present disclosure.

As shown in FIG. 6, a device for labeling transient voltage stability samples in a power grid based on semi-supervised learning includes a memory, a processor, and a computer program stored in the memory and running on the processor. The processor executes the computer program to implement the method for labeling transient voltage stability samples in a power grid based on semi-supervised learning.

Those skilled in the art should clearly understand that, for convenient and concise description, only the division of the above-mentioned functional units/modules is used as an example for illustration. In practical application, the above-mentioned functions may be realized by different functional units/modules as required, that is, an internal structure of the apparatus is divided into different functional units or modules to complete all or part of the above-described functions. The functional units/modules in the embodiments may be integrated into one processing unit, or each of the units may exist alone physically, or two or more units are integrated into one unit. The above integrated unit may be implemented either in a form of hardware or in a form of a software functional unit. In addition, specific names of the functional units/modules are only for the convenience of distinguishing each other, and are not intended to limit the protection scope of the present disclosure. For specific working processes of the units/modules in the above system, reference may be made to the corresponding processes in the above method embodiments, and details are not described herein again.

In the above embodiments, the description of the embodiments each has a focus, and portions not described or recorded in detail in one embodiment may refer to the description of other embodiments. A person of ordinary skill in the art may be aware that, in combination with the examples described in the embodiments disclosed in this specification, units and algorithm steps may be implemented by electronic hardware or a combination of external device software and electronic hardware. Whether the functions are performed by hardware or software depends on particular applications and design constraints of the technical solutions. A person skilled in the art may use different methods to implement the described functions for each specific application, but such implementation should not be considered to be beyond the scope of the present disclosure.

It should be understood that the apparatus and method disclosed in the embodiments of the present disclosure may be implemented in other manners. For example, the described system embodiments are merely examples. For example, the module or unit division is merely logical function division and may be other division in actual implementation. For example, a plurality of units or components may be combined or integrated into another system, or some features may be ignored or not performed. In addition, the intercoupling or direct coupling or communication connection shown or discussed may be indirect coupling or communication connection through some interfaces, apparatuses, or units; or may be implemented in electrical, mechanical, or other forms.

The units described as separate parts may be or may not be physically separate, and parts displayed as units may be or may not be physical units, may be located in one position, or may be distributed on a plurality of network units. Some or all of the units may be selected according to actual needs to achieve the objectives of the solutions of embodiments.

The above integrated unit, if implemented in a form of the software functional unit and sold or used as a stand-alone product, may be stored in a computer-readable storage medium. Based on such an understanding, all or some of processes for implementing the method in the foregoing embodiments can be completed by computer program 503 instructing relevant hardware. The computer program 503 may be stored in a computer-readable storage medium. The computer program 503 is executed by processor 501 to perform the steps of the foregoing method embodiments. The computer-readable storage medium storing the computer program 503 and the processor 501 constitute device 5 for labeling transient voltage stability samples in a power grid based on semi-supervised learning. The computer program 503 includes code of the computer program 503, and the code of the computer program 503 may be in a form of source code, a form of object code, an executable file, some intermediate forms, or the like. The computer-readable storage medium may include: any physical entity or apparatus capable of carrying the code of the computer program 503, a recording medium, a USB disk, a mobile hard disk drive, a magnetic disk, an optical disc, computer-readable memory 502, Read-Only Memory (ROM) 502, Random Access Memory (RAM) 502, an electrical carrier signal, a telecommunications signal, a software distribution medium, and the like. It should be noted that, the content contained in the computer-readable storage medium may be added or deleted properly according to the legislation and the patent practice in the jurisdiction. For example, in some jurisdictions, depending on the legislation and the patent practice, the computer-readable storage medium may not include the electrical carrier signal or the telecommunications signal.

It should be noted that the above embodiments are merely intended to describe the technical solutions of the present disclosure, rather than to limit the present disclosure. Although the present disclosure is described in detail with reference to the above embodiments, those of ordinary skill in the art should understand that they can still modify the technical solutions described in the above embodiments or make equivalent substitutions on some technical features therein. These modifications or substitutions do not make the essence of the corresponding technical solutions deviate from the spirit and scope of the technical solutions of the embodiments of the present disclosure, and shall fall within the protection scope of the present disclosure.

The invention claimed is:

1. A method for labeling transient voltage stability samples in a power grid based on semi-supervised learning, comprising following steps:
   S1: obtaining a transient voltage time series trajectory $V^i$ formed for each load bus in the power grid under N transient operating scenarios, wherein $1 \leq i \leq N$; and integrating all $V^i$ into a voltage time series dataset V;
   S2: preliminarily labeling the stability status of each transient operating scenario based on the voltage time series dataset V, and integrating the labeling result $Y_i$ into a class label dataset Y;
   S3: using V and Y as the input data and output data respectively to construct a voltage stability sample set $S=\{(V^i, Y_i)|1 \leq i \leq N\}$, integrating a sample whose class information is unknown in the S into a sample subset $S_u$, with a sample quantity denoted as $N_u$, and integrating remaining data in the S into a sample subset $S_k$, with a sample quantity denoted as $N_k$, wherein $N_k+N_u=N$;
   S4: labeling stability statuses of the $N_u$ samples in $S_u$ by using a semi-supervised clustering learning method and a semi-supervised classification learning method, to obtain labeling results $Y_{1j}$ and $Y_{2j}$ respectively, and integrating the labeling results $Y_{1j}$ and $Y_{2j}$ into result datasets $Y_{u1}$ and $Y_{u2}$ respectively, wherein $1 \leq j \leq N_u$;
   wherein the procedure of obtaining the result dataset $Y_{u1}$ in the S4 comprises following specific content:
   performing unsupervised learning on input data of all samples in the S by using an autoencoder algorithm based on convolutional neurons, and extracting feature information of a hidden layer from an autoencoder based on convolutional neurons;
   performing clustering-enabled labeling on all the samples in the $S_u$ by using a semi-supervised clustering algorithm with the extracted feature information of the hidden layer as an input and class information of all samples in the $S_k$ as supervised information;
   if the clustering-enabled labeling result is stable, labeling the class of a current sample as $Y_{1j}=1$;
   if the clustering-enabled labeling result is unstable, labeling the class of the current sample as $Y_{1j}=-1$; and after completing the clustering-enabled labeling for the $N_u$ samples in the $S_u$, integrating all labeling results $Y_{1j}$ into the result dataset $Y_{u1}$;

S5: performing interactive verification on the $Y_{u1}$ and the $Y_{u2}$, moving all samples that pass the interactive verification from the $S_u$ to the $S_k$, and updating the $S_u$ and the $S_k$; and S6: performing repeated iteration on the S4 and the S5 until all samples in the $S_u$ pass the interactive verification or the repeated iteration is performed for M times, using $Y_{u1}$ obtained through the last-round iteration as the final labeling result of the $S_u$, merging finally updated sample subsets $S_u$ and $S_k$, and exporting a complete sample set $S'=S_u \cup S_k$ as the final sample set with definite transient voltage stability classes.

2. The method for labeling the transient voltage stability samples in the power grid based on semi-supervised learning according to claim 1, wherein the S1 comprises following specific content:

collecting the N transient operating scenarios of the power grid that possibly occur in future T hours, performing N time-domain simulations on the collected N transient operating scenarios by using an electromechanical transient time-domain simulation method, and collecting the transient voltage time series trajectory of each load bus in the power grid after each time-domain simulation ends.

3. The method for labeling the transient voltage stability samples in the power grid based on semi-supervised learning according to claim 1, wherein the S2 comprises following specific content:

S21: calculating the maximum Lyapunov exponent $\lambda_i$ for each transient operating scenario based on the V, S22: preliminarily labeling the stability status of each transient operating scenario based on the $\lambda_i$; and S23: integrating the labeling result $Y_i$ into the class label dataset Y.

4. The method for labeling the transient voltage stability samples in the power grid based on semi-supervised learning according to claim 3, wherein the S21 comprises following specific content:

within a monitoring time window $\Delta T$, the maximum Lyapunov exponent of an $i^{th}$ transient operating scenario is:

$$\lambda_i = \frac{1}{nK\Delta t} \cdot \sum_{m=1}^{n} \ln \left\| \left( V^i_{(K+m)\Delta t} - V^i_{(K+m-1)\Delta t} \right) / \left( V^i_{m\Delta t} - V^i_{(m-1)\Delta t} \right) \right\|$$

wherein $\Delta t$ represents the time interval for sampling the transient voltage time series trajectory $V^i$, K represents the number of sampling points contained in the monitoring time window $\Delta T$, $\Delta T = K\Delta t$, n represents the number of initial trajectory sampling points that is used to estimate the deviation of a time series trajectory in a process of calculating the maximum Lyapunov exponent, m represents the sequence number of an initial trajectory sampling point, $1 \leq m \leq n$, and $V_{k\Delta t}^i$ represents the voltage vector of each load bus at the $k^{th}$ sampling point in the transient voltage time series trajectory $V^i$, wherein k represents the sequence number of a sampling point, comprising K+m, K+m−1, m, and m−1.

5. The method for labeling the transient voltage stability samples in the power grid based on semi-supervised learning according to claim 1, wherein the S22 comprises following specific content:

setting a determination threshold $\eta$, wherein $\eta > 0$;

if $\lambda_i > \eta$, determining that the transient operating scenario is in an obviously stable status, and labeling the class of the transient operating scenario as $Y_i = 1$;

if $\lambda_i < -\eta$, determining that the transient operating scenario is in an obviously unstable status, and labeling the class of the transient operating scenario as $Y_i = -1$; and if $-\eta \leq \lambda_i \leq \eta$, determining that the transient operating scenario is in an unknown status, and labeling the class of the transient operating scenario as $Y_i = 0$.

6. The method for labeling the transient voltage stability samples in the power grid based on semi-supervised learning according to claim 1, wherein in the S3:

a sample with $Y_i = 0$ in the S is a sample whose class information is unknown, and the sample with $Y_i = 0$ is integrated into the sample subset $S_u$, with the sample quantity denoted as the $N_u$; and a sample with $Y_i \neq 0$ in the S is integrated into the sample subset $S_k$ with known classes, with the sample quantity denoted as the $N_k$.

7. The method for labeling the transient voltage stability samples in the power grid based on semi-supervised learning according to claim 1, wherein the procedure of obtaining the result dataset $Y_{u2}$ in the S4 comprises following specific content:

performing unsupervised learning on input data of all samples in the S by using a long short-term memory (LSTM)-based autoencoder algorithm;

copying an LSTM-based autoencoder neural network, connecting the copied encoder neural network to a fully connected layer and a softmax activation layer to construct an LSTM classification model, and then inputting all samples in the $S_k$ into the constructed LSTM classification model for supervised finetuning and training to obtain a trained LSTM classification model;

inputting all the samples in the $S_u$ into the trained LSTM classification model for classification-enabled labeling:

if a classification-enabled labeling result is stable, labeling the class of a current sample as $Y_{2j} = 1$;

if the classification-enabled labeling result is unstable, labeling the class of the current sample as $Y_{2j} = -1$; and after completing the classification-enabled labeling for the $N_u$ samples in the $S_u$, integrating all labeling results $Y_{2j}$ into the result dataset $Y_{u2}$.

8. The method for labeling the transient voltage stability samples in the power grid based on semi-supervised learning according to claim 1, wherein the performing interactive verification on the $Y_{u1}$ and the $Y_{u2}$ in the S5 comprises following specific content:

if $Y_{1j} = Y_{2j}$, determining that the $j^{th}$ sample in the $S_u$ has passed the interactive verification; and if $Y_{1j} \neq Y_{2j}$, determining that the $j^{th}$ sample in the $S_u$ has not passed the interactive verification.

9. A device for labeling transient voltage stability samples in a power grid based on semi-supervised learning, based on the method for labeling the transient voltage stability samples in the power grid based on semi-supervised learning according to claim 1, and comprising a memory, a processor, and a computer program stored in the memory and running on the processor, wherein the processor executes the computer program to implement the method for labeling the transient voltage stability samples in the power grid based on semi-supervised learning.

10. The device for labeling the transient voltage stability samples in the power grid based on semi-supervised learning according to claim 9, wherein the S1 of the method for labeling the transient voltage stability samples in the power grid based on semi-supervised learning comprises following specific content:

collecting the N transient operating scenarios of the power grid that possibly occur in future T hours, performing N time-domain simulations on the collected N transient operating scenarios by using an electromechanical transient time-domain simulation method, and collecting the transient voltage time series trajectory of each load bus in the power grid after each time-domain simulation ends.

11. The device for labeling the transient voltage stability samples in the power grid based on semi-supervised learning according to claim 9, wherein the S2 of the method for labeling the transient voltage stability samples in the power grid based on semi-supervised learning comprises following specific content:

S21: calculating the maximum Lyapunov exponent $\lambda_i$ for each transient operating scenario based on the V;

S22: preliminarily labeling the stability status of each transient operating scenario based on the $\lambda_i$; and S23: integrating the labeling result $Y_i$ into the class label dataset Y.

12. The device for labeling the transient voltage stability samples in the power grid based on semi-supervised learning according to claim 11, wherein the S21 comprises following specific content:

within a monitoring time window $\Delta T$, the maximum Lyapunov exponent of an $i^{th}$ transient operating scenario is:

$$\lambda_i = \frac{1}{nK\Delta t} \cdot \sum_{m=1}^{n} \ln \left\| \left( V^i_{(K+m)\Delta t} - V^i_{(K+m-1)\Delta t} \right) / \left( V^i_{m\Delta t} - V^i_{(m-1)\Delta t} \right) \right\|$$

wherein $\Delta t$ represents the time interval for sampling the transient voltage time series trajectory $V^i$, K represents the number of sampling points contained in the monitoring time window $\Delta T$, $\Delta T = K\Delta t$, n represents the number of initial trajectory sampling points that is used to estimate the deviation of a time series trajectory in a process of calculating the maximum Lyapunov exponent, m represents the sequence number of an initial trajectory sampling point, $1 \leq m \leq n$, and $V_{k\Delta t}^i$ represents the voltage vector of each load bus at the $k^{th}$ sampling point in the transient voltage time series trajectory $V^i$, wherein k represents the sequence number of a sampling point, comprising K+m, K+m−1, m, and m−1.

13. The device for labeling the transient voltage stability samples in the power grid based on semi-supervised learning according to claim 11, wherein the S22 comprises following specific content:

setting a determination threshold $\eta$, wherein $\eta > 0$;

if $\lambda_i > \eta$, determining that the transient operating scenario is in an obviously stable status, and labeling the class of the transient operating scenario as $Y_i = 1$;

if $\lambda_i < -\eta$, determining that the transient operating scenario is in an obviously unstable status, and labeling the class of the transient operating scenario as $Y_i = -1$; and if $-\eta \leq \lambda_i \leq \eta$, determining that the transient operating scenario is in an unknown status, and labeling the class of the transient operating scenario as $Y_i = 0$.

14. The device for labeling the transient voltage stability samples in the power grid based on semi-supervised learning according to claim 9, wherein in the S3 of the method for labeling the transient voltage stability samples in the power grid based on semi-supervised learning:

a sample with $Y_i = 0$ in the S is a sample whose class information is unknown, and the sample with $Y_i = 0$ is integrated into the sample subset $S_u$, with the sample quantity denoted as the $N_u$; and a sample with $Y_i \neq 0$ in the S is integrated into the sample subset $S_k$ with known classes, with the sample quantity denoted as the $N_k$.

15. The device for labeling the transient voltage stability samples in the power grid based on semi-supervised learning according to claim 9, wherein in the method for labeling the transient voltage stability samples in the power grid based on semi-supervised learning, the procedure of obtaining the result dataset $Y_{u2}$ in the S4 comprises following specific content:

performing unsupervised learning on input data of all samples in the S by using an LSTM-based autoencoder algorithm;

copying an LSTM-based autoencoder neural network, connecting the copied encoder neural network to a fully connected layer and a softmax activation layer to construct an LSTM classification model, and then inputting all samples in the $S_k$ into the constructed LSTM classification model for supervised finetuning and training to obtain a trained LSTM classification model;

inputting all the samples in the $S_u$ into the trained LSTM classification model for classification labeling:

if a classification labeling result is stable, labeling the class of a current sample as $Y_{2j} = 1$;

if the classification labeling result is unstable, labeling the class of the current sample as $Y_{2j} = -1$; and after completing the classification labeling for the $N_u$ samples in the $S_u$, integrating all labeling results $Y_{2j}$ into the result dataset $Y_{u2}$.

16. The device for labeling the transient voltage stability samples in the power grid based on semi-supervised learning according to claim 9, wherein in the method for labeling the transient voltage stability samples in the power grid based on semi-supervised learning, the performing interactive verification on the $Y_{u1}$ and the $Y_{u2}$ in the S5 comprises following specific content:

if $Y_{1j} = Y_{2j}$, determining that the $j^{th}$ sample in the $S_u$ has passed the interactive verification; and if $Y_{1j} \neq Y_{2j}$, determining that the $j^{th}$ sample in the $S_u$ has not passed the interactive verification.

* * * * *